Nov. 14, 1939.  N. V. FEDOTOFF  2,179,718
AUTOMATIC CAMERA SHUTTER DEVICE
Filed June 9, 1938
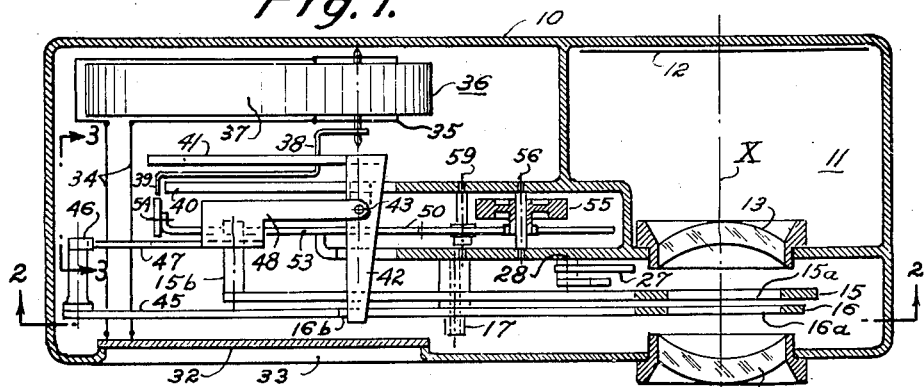
Fig. 1.
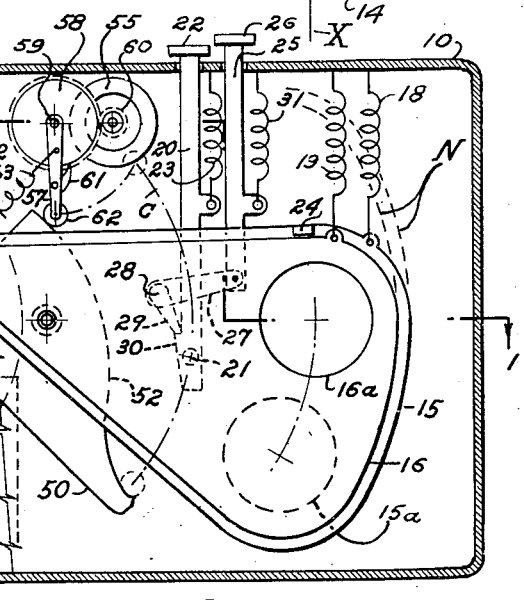
Fig. 2.
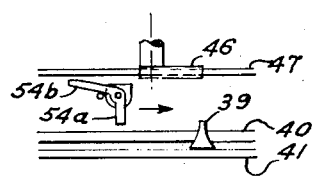
Fig. 3.
Nicholas V. Fedotoff
INVENTOR.
BY
ATTORNEY.

Patented Nov. 14, 1939

2,179,718

UNITED STATES PATENT OFFICE 2,179,718

AUTOMATIC CAMERA SHUTTER DEVICE

Nicholas V. Fedotoff, Lynbrook, N. Y.

Application June 9, 1938, Serial No. 212,621

10 Claims. (Cl. 95—60)

This invention relates to camera devices and particularly to a device of the character described for controlling a photographic exposure in accordance with the intensity of the illumination of an object to be photographed.

Various devices of this character, utilizing photo-electric devices for effecting the automatic control, have heretofore been designed. In general, however, these devices have not been satisfactory in that they involved relatively complicated or expensive apparatus, did not provide precise and dependable control action, and/or were otherwise objectionable.

It is an object of the present invention, therefore, to provide an improved camera device which is automatically adjustable to provide an exposure in accordance with the intensity of the illumination of an object to be photographed.

A further object of the invention is to provide a camera device of the character described which provides a precise and dependable control action, is of relatively simple and inexpensive construction, and does not include the objectionable characteristics of devices of the prior art mentioned above.

The present invention is in the nature of an improvement of my Automatic photographic shutter described and claimed in my copending application, Serial No. 177,757, filed December 2, 1937.

In accordance with the present invention there is provided an automatic camera shutter device comprising curtain means for effecting a photographic exposure to an object. A first control means is arranged to adjust the curtain means to initiate the exposure. An indicating means is provided which is responsive to the illumination of the object. The indicating means may, for example, be a photoelectric cell having a non-linear response characteristic. The device also includes auxiliary control means movable over a predetermined range determined by the indicating means for controlling the curtain means to terminate the exposure. Means are further provided for controlling, as, for example, by effecting a predetermined variation in its rate of movement, the auxiliary control means as it moves over its range to ensure a predetermined relation between the time of exposure and the value of the illumination. For example, the latter means may compensate for the non-linearity of the response characteristic of said indicating means.

For a better understanding of the invention, together with other and further objects thereof and advantages achieved thereby, reference may be had to the following description, taken in connection with the accompanying drawing, and its scope will be pointed out in the appended claims.

In the accompanying drawing, Fig. 1 is a horizontal sectional view of a camera embodying the automatic shutter device of the present invention; Fig. 2 is a vertical sectional view of the camera taken on the line 2—2 of Fig. 1, with certain parts broken away for the purpose of clarity, the line I—I in Fig. 2 indicating the section on which Fig. 1 is taken; and Fig. 3 is a fragmentary view looking in the direction of the arrows 3—3 of Fig. 2 showing relative positions of certain of the parts of the structure.

Referring now more particularly to the drawing, the camera there illustrated comprises a casing structure including inner retaining walls, indicated generally by the numeral 10. This structure may be of any suitable material, such as a plastic, and will preferably be integrally formed, as shown. The wall structure is so formed as to provide an enclosed chamber 11 in which the photographic film may be provided in conventional manner, as indicated at 12. Suitable openings, having lenses 13 and 14 fitted therein, are formed in the wall structure, as shown, so that the film is disposed normal to, and in alignment with, the optical axis of the camera through the lenses, as indicated at X.

Coming now to the automatic shutter device, the structure thereof comprises a pair of blades 15, 16, which are pivotally mounted for independent movement on a suitable bearing 17 which is secured to the wall structure, as shown. Openings 15a and 16a are formed in the blades 15 and 16, respectively, in such position that with the blade 16 in its lower position, indicated in both Figs. 1 and 2, and with the blade 15 in its upper or normal position shown only in Fig. 1, the openings 15a and 16a are concentric with the lenses 13 and 14 and, therefore, effect exposure of the film 12 to an object to be photographed disposed in front of the camera in the path of its optical axis.

Spring members 18 and 19 are secured at their opposite ends to the wall structure and to the blades 15 and 16, respectively, and serve normally to hold the blades under tension in their upper positions, these being indicated in Fig. 2 by the broken lines N. In this position, since the openings 15a and 16a do not register, there is, of course, no exposure.

For the purpose of effecting an initial adjustment of the blades 15 and 16 prior to effecting an exposure, a rod 20 is extended through a suitable opening formed in the upper wall of the casing 10, and is pivotally secured at its lower end to a side of the blade 15, as indicated at 24. A suitable push button 22 is preferably formed on the outer end of the rod 20. A spring 23 is connected between a lug on the rod 20 and the upper wall of the casing and serves to aid the spring 18 in normally holding the rod 20 and blade 15 in their upper positions. A projection 24 is formed on the blade 15 so as to extend over the upper edge of the blade 16, to the end that the latter is carried to and held in its lower position when ever the rod 20 and blade 15 are moved to their lower positions, as shown in Fig. 2.

For the purpose of temporarily retaining the blades in their lower or initial adjustment position and readily effecting their subsequent release, there is provided a second rod 25, which extends through an opening in the casing 10 adjacent that of the rod 20, and which is provided with a suitable push button 26 at its outer upper end and is pivotally connected to one end of an arm 27. The lower end of the arm 27 is pivotally mounted on a bearing 28, secured in the inner wall structure of the casing, as shown. A pawl 29 is rigidly secured to the arm 27 and adapted to engage the arm 20 above a projection 30 formed thereon when the arm 25 and, hence, the end of the arm 27 connected thereto are in their upper positions, as shown in Fig. 2. A spring 31 is connected between a suitable lug on the arm 25 and the upper wall of the casing and serves normally to hold under its tension the rod 25 in its upper position. With the rods 20 and 25 in the positions shown in Fig. 2, pressure of the push button 26 will effect outward pivotal movement and disengagement of the pawl 29 from the projection 30 and, hence, effect release of the blade 15, permitting it to be returned, by virtue of the action of the springs 18 and 28, to its normal or upper position.

For the purpose of effecting a control of the shutter action or, more particularly, the action of the blade 16, which is in accordance with the intensity of the illumination of an object to be photographed, there is provided for the device, light intensity indicating means. In the embodiment of the invention illustrated, this means comprises a photoelectric cell 32 disposed at a suitable opening 33 formed in the front wall of the casing. The cell 32 is connected by suitable conductors 34 to the movable winding 35 of a direct current meter 36, which also comprises a permanent magnet 37. The meter is disposed in the casing 19 at the rear thereof, as shown. A suitable indicating arm 38 is carried by the movable winding 35 and is provided with a projecting end 39, as shown. The meter 36 may be of any suitable well-known construction, for example, of the conventional d'Arsenval type.

For the purpose of holding the indicating arm 38 in fixed position after it has been moved, by virtue of the action of the photoelectric cell 32 and winding 35, during the period from the initial adjustment to the initiation of the exposure, an inner wall member 40 is provided in the casing so that the arm 40 extends at one side thereof as shown. A retaining plate 41 is disposed opposite the other side of the arm 38 and is provided at its opposite ends with arms 42 which extend forwardly, one arm being shown in Fig. 1, and are pivotally connected as indicated at 43 to a rigid support secured to the casing wall structure.

A projecting arm 16b is formed on the blade 16 and is adapted to engage the extended end of the upper arm 42 thereby to swing the plate 41 forwardly so as to press the indicating arm 38 against the wall member 40 and hold the arm 38 rigid when the blade 16 is moved to its lower position.

For the purpose of retaining the blade 16 in its lower position, for a predetermined period after initial adjustment and after release of the blade 15, an arm 45 is formed on the blade 16 and a pawl 46 is rigidly secured at one side of the end of this arm. A plate member 47 is disposed adjacent the arm 45 and is provided with extending end members 48 which are pivotally mounted on the bearings 43, as shown. A projection 49 is formed on the plate member 47 and is adapted, when the member is in its normal or outer position, to be engaged by the pawl 46 and, hence, the blade 16 is held in the position shown in Fig. 2.

In order to release the blade 16 from its lower or initial adjustment position, thereby to terminate the exposure in accordance with the preferred embodiment of the invention illustrated, there is provided a cam member 50 which is pivotally mounted on a bearing 51 substantially in alignment with the axis of the indicator arm 38. The cam member is provided with a curved surface 52, hereinafter further described, and an arm 53 which extends adjacent one side of the plate 47. A projection 15b is formed on the left end of the blade 15 and is adapted to engage the arm 53, thereby to move the cam member to the position shown in Fig. 2, when the rod 20 is depressed and the blades 15 and 16 are brought to initial adjustment position. A double-arm pawl 54 (see particularly Figs. 1 and 3) is pivotally connected to the end of the arm 53 so that one of its arms 54a is adapted to strike against the end 39 of the indicating arm 38, when the cam member is pivotally moved sufficiently far, counterclockwise, about its bearing, thereby to cause the other pawl arm 54b to press against the plate 47 and pivotally move the same out of engagement with the pawl 46. The shutter 16 is thus released and permitted to return to its normal position, thereby terminating the exposure.

For the purpose of controlling the rate of movement of the cam member, so as to compensate for certain characteristics of the system, as, for example, the nonlinear characteristic of the indicating means, as hereinafter further explained, and to effect the precise desired relation between the duration of exposure and the illumination of the object, the cam surface 52 is of a predetermined particular curvature and there is provided in connection therewith a suitable delay means. In the present embodiment of the invention, the delay means comprises a spring and mass arrangement, although any suitable delay means may, of course, be utilized. More particularly, a mass or flywheel 55 is rotatably mounted on a bearing 56 which is secured in the casing inner wall structure, as shown. Arm 57 and a gear 58 are rotatably mounted for independent movement on a bearing 59 also secured to the wall structure. The gear 58 is meshed with a relatively small gear 60, which latter is rigidly secured to the flywheel 55. A pawl 61 is secured to the arm 57 and adapted to engage the teeth of the gear 58 so as to effect rotation of the same whenever the arm is moved in a counterclockwise direction. A roller 62 is mounted on the end of the arm 57 and adapted to engage and roll over the surface 52 of the cam 50, when the latter is pivotally moved. A spring 63 is connected between a mid-point on the arm 57 and a suitable point on the wall structure of the casing, and serves to constrain the arm 57, or more accurately its roller 62, against the curved cam surface 52. A spring 64, however, is connected between a mid-point on the cam arm 53 and the casing wall structure. This spring serves normally to hold the cam member in its upper position, as indicated by the broken line C in Fig. 2. It brings the cam to the latter position while effecting acceleration of the rotating mass 55 from the position shown in Fig. 2, when the blade 15 is released and its projection 15b permits return movement of the cam member.

Since most of the details of operation of the various parts of the device have been explained in connection with the above description of their construction, only a general explanation of the operation of the invention is further necessary. Briefly, when the camera is focused on an object to be photographed, with the film 12 in proper position and the rods 20 and 25 and, hence, the blades 15 and 16 in their upper positions, the photoelectric cell 32 will, by emitting electrons in accordance with the intensity of the illumination of the object, operate the meter 36 and adjust the indicating arm 38 to a position corresponding in distance from the pawl arm 54a to the intensity of the illumination of the object. The rod 20 will then be pressed down carrying the blade 15 and, hence, the blade 16, due to the projection 24, to their lower positions, with their openings 15a and 16a still out of register. Simultaneously with the last-described action, the plate 41, through the medium of the projection 16b and arm 42, will be moved forward so as to press the indicating arm 38 against the wall 40 and temporarily lock the same in this position. Also, simultaneously with this action, the cam 50 will be moved by the projection 15b on the blade 15 into the lower position, as shown in Fig. 2, and the pawl 46 on the end of the arm 45a of blade 16 will engage the projection 49 so as to hold the blade 16 in its lower position.

The camera will now be ready for the exposure. This is initiated by pressing down the rod 25 to effect disengagement of the pawl 29 from projection 30, thereby to release the rod 20 and, hence, the blade 15. The blade 15 thereupon immediately returns to its normal upper position. In this position of the two blades 15 and 16, their openings 15a and 16a register and the exposure of the film is initiated. The exposure will continue until the blade 16 is also returned to its normal position. The latter action is determined by the auxiliary control mechanism. As soon as the blade 15 has returned to its upper position, the removal of the projection 15b permits the cam to be returned by spring 64 to its normal position, rotating about its bearing against the force of acceleration of the fly wheel 55 as effected by the movement of the arm 57 as its roller 62 moves over the curved surface 52.

As explained above, the curvature of this surface is such as to ensure the desired relation between the time of exposure and the value of the illumination, in this embodiment by compensating for the nonlinear operating characteristics of the indicating means. Any other time characteristic of the system which must be considered in effecting the proper exposure for the amount of illumination of the object may also be similarly compensated for. The required curvature is readily determinable either mathematically or experimentally.

When the cam is rotated sufficiently so that the pawl arm 54a strikes the end 39 of the indicating arm and causes the pawl arm 54b to move the plate 47 out of engagement with the pawl 46, the blade 16 is thus released and its spring 18 immediately returns it to its upper position; since in the latter position the opening 16a is no longer in register with the lens openings, the exposure is terminated.

The duration of the exposure is, as explained, therefore, determined primarily by the position of the indicating arm 38 as effected by the illumination of the object. More particularly, this position determines the distance which the cam must travel before it effects release of the blade 16; and the cam, by virtue of its curved surface and the delay apparatus, travels in a predetermined manner, thereby to effect the required predetermined duration of exposure. As further mentioned above, since the response of the indicating means may not be linearly related to the amount of illumination and since other characteristics of the system may also need to be compensated for, proper gradations of exposure ordinarily would not be effected if the cam moved at a uniform rate of speed over its range. In order, therefore, to compensate for such characteristic, the cam surface, as explained above, is curved as indicated in Fig. 2, so as to produce a non-uniform speed of the cam and effect a predetermined variation in the rate of movement of the cam which is complemental to, and compensates for, these characteristics. The cam surface, by virtue of its sharply changing curvature, which change of curvature is so great that it changes from convex where it engages roller 62 in the cam's initial position to concave near its position of advanced rotation, causes the wheels 58 and 55 to rotate very slowly at first and to speed up very rapidly as the rotation of the cam progresses, so that the rotation of the cam becomes progressively slower. The precise required amount of exposure for any given amount of illumination may thus automatically be effected by the device of the present invention, over a wide range of illumination values.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Mechanism for operating a photographic shutter having a pair of movable curtains for making an exposure to an object, said mechanism comprising: a setting arm for moving both curtains to a set position in which the second curtain is in exposure position and the first curtain in non-exposure position, catch means for holding both curtains in the set position, a lever for releasing the first curtain to its exposure position to start the exposure, a timing device set into timing operation upon the release of said first curtain, said timing device having a timer arm which moves progressively during the timing, a photo-sensitive cell responsive to the light from the object, a light indicating arm in the patch of progression of said timer arm, said indicating arm assuming a position the advancement of which is dependent on the light on said cell, the arrangement being such that when the advancing timer arm strikes the indicating arm the catch holding the second curtain is released, enabling the latter curtain to move to its non-exposure position terminating the exposure.

2. Mechanism according to claim 1 in which the setting arm operates on said first curtain and an arm on said first curtain moves the second curtain to the set position.

3. Mechanism for controlling the exposure to an object of a photographic shutter having a pair of movable curtains each providing an aperture through which the exposure is made along an optical axis, and operating means for moving both of said curtains to align their apertures with the axis to start the exposure, said mechanism comprising: a catch for holding the second of said curtains in the aligned position against a force tending to move it out of the aligned position and time controlled means for releasing said catch, comprising a photo-sensitive cell exposed to light from the object, a light indicating arm movable along a path for a distance dependent on the light on said cell, a movable timing element having a timing arm set into motion along said path upon the alignment of both said apertures, said timing arm having a member which upon striking said indicating arm releases said catch, and means for moving said first curtain to a mis-aligned position upon release of said catch to terminate the exposure.

4. In a camera having a pair of movable curtains each providing an aperture through which an exposure to an object is made along an optical axis, mechanism for controlling said curtains comprising: operating means for moving both of said curtains to align their apertures with the axis, a catch for holding one of said curtains in its exposure position against a force tending to move it out of its exposure position, a cam automatically released at the beginning of said exposure, means for urging said cam in one direction, a rider which follows said cam, a mass having inertia movable by said rider, a timer arm movable along a path by movement of said cam, a photo-sensitive cell responsive to the light on said object, a light indicating arm operated by said cell and located in said path at a position of advancement dependent on the light on said cell, and a member on said timer arm which releases said catch upon striking said indicating arm, thereby allowing the curtain held by it to move to a non-exposure position.

5. Mechanism according to claim 4 in which said cam surface has an eccentricity which causes said movable mass to speed up.

6. In a camera having a pair of movable curtains each providing an aperture through which an exposure to an object is made along an optical axis, mechanism for controlling said curtains comprising: operating means for moving the curtains to a set position to misalign the aperture of the first curtain with the axis and to align the aperture of the second curtain with the axis, means for releasing the first curtain from the set position to move it to the aligned position to start the exposure, a catch for holding the second curtain in the aligned position after release of the first curtain, a timing arm released upon release of said first curtain, a spring for moving said timing arm along a predetermined path after its release, a mass accelerated by the force of the spring-moved arm, said acceleration retarding the motion of said arm, a photo-sensitive cell responsive to the light on said object, a light indicating arm operated by said cell and located in said path at a position of advancement dependent on the light on said cell, and a member on said timing arm which releases said catch upon striking said pointer arm, thereby allowing the curtain held by the catch to move to a non-exposure position.

7. Mechanism according to claim 6 in which the motion of the timer arm is decelerated by said mass and spring.

8. Timing mechanism for timing the exposure of a photographic shutter, said mechanism comprising a catch for holding the shutter in the exposure position after commencement of the exposure, a timing arm released upon commencement of the exposure, means for moving said timing arm along a predetermined path after its release, a mass accelerated by the force of the moving arm, said acceleration retarding the motion of said arm, a photo-sensitive cell responsive to the light from the object to which the exposure is made, a light indicating arm operated by said cell and located in said path at a position of advancement dependent on the light on said cell, and a member on said timing arm which releases said catch upon striking said indicating arm, thereby allowing the shutter to move to non-exposure position.

9. Timing mechanism for timing the exposure of a photographic shutter, said mechanism comprising a catch for holding the shutter in exposure position after commencement of the exposure, a timing arm released upon commencement of the exposure, means for urging said timing arm along a predetermined path after its release, means applying a restraining force to said arm restraining its speed of motion along said path, a photo-sensitive cell responsive to the light on the object to which the exposure is made, a light indicating arm operated by said cell and located in said path at a position of advancement dependent on the light on said cell, and a member on said timing arm which releases said catch upon striking said indicating arm, thereby allowing the shutter to move to non-exposure position.

10. Timing mechanism for timing the exposure of a photographic shutter, said mechanism comprising a catch for holding the shutter in the exposure position after commencement of the exposure, a timing arm released upon commencement of the exposure, a spring for moving said timing arm along a predetermined path after its release, a movable mass, driving means interconnecting the arm and the mass and establishing predetermined varying ratios of speed between the arm and the mass while the arm is moving, the ratio of the mass speed to the arm speed increasing as the arm advances, a photo-sensitive cell responsive to light from the object to which the exposure is made, a light indicating arm operated by said cell and located in said path at a position of advancement dependent on said light, and a member on said timing arm which releases said catch upon striking said indicating arm, thereby allowing the shutter to move to non-exposure position.

NICHOLAS V. FEDOTOFF.